United States Patent
Ayres et al.

(10) Patent No.: US 10,948,714 B2
(45) Date of Patent: Mar. 16, 2021

(54) DISPERSION COMPENSATION

(71) Applicant: Akonia Holographics, LLC, Longmont, CO (US)

(72) Inventors: Mark R. Ayres, Boulder, CO (US); Adam Urness, Louisville, CO (US); Kenneth E. Anderson, Longmont, CO (US); Friso Schlottau, Lyons, CO (US)

(73) Assignee: Akonia Holographies LLC, Longmont, CO (US)

( * ) Notice: Subject to any disclaimer, the term of this patent is extended or adjusted under 35 U.S.C. 154(b) by 562 days.

(21) Appl. No.: 15/818,728

(22) Filed: Nov. 20, 2017

(65) Prior Publication Data
US 2018/0143426 A1 May 24, 2018

Related U.S. Application Data

(60) Provisional application No. 62/424,290, filed on Nov. 18, 2016.

(51) Int. Cl.
| | |
|---|---|
| *G02B 27/00* | (2006.01) |
| *G03H 1/22* | (2006.01) |
| *G02B 5/18* | (2006.01) |
| *G02B 5/08* | (2006.01) |
| *G02B 27/01* | (2006.01) |
| *G03H 1/02* | (2006.01) |
| *G03H 1/26* | (2006.01) |

(Continued)

(52) U.S. Cl.
CPC ....... *G02B 27/0025* (2013.01); *G02B 5/0883* (2013.01); *G02B 5/18* (2013.01); *G02B 6/29394* (2013.01); *G02B 6/34* (2013.01); *G02B 27/0172* (2013.01); *G03H 1/0248* (2013.01); *G03H 1/2286* (2013.01); *G02B 2027/0116* (2013.01); *G02B 2027/0174* (2013.01); *G03H 2001/2231* (2013.01); *G03H 2001/2289* (2013.01); *G03H 2001/266* (2013.01)

(58) Field of Classification Search
CPC ............ G02B 27/0025; G02B 27/0037; G02B 6/29394; G03H 1/0248
See application file for complete search history.

(56) References Cited

U.S. PATENT DOCUMENTS

| | | | | |
|---|---|---|---|---|
| 5,420,947 A | * | 5/1995 | Li ............................ | G02B 6/34 359/569 |
| 5,625,499 A | * | 4/1997 | Chen ....................... | G02B 5/04 359/569 |

(Continued)

*Primary Examiner* — Eric L Bolda
(74) *Attorney, Agent, or Firm* — Michael H. Lyons

(57) ABSTRACT

A method of dispersion compensation in an optical device is disclosed. The method may include identifying a first hologram grating vector of a grating medium of the optical device. The first hologram grating vector may correspond to a first wavelength of light. The method may include determining a probe hologram grating vector corresponding to a second wavelength of light different from the first wavelength of light. The method may also include determining a dispersion-compensated second hologram grating vector based at least in part on the probe hologram grating vector and the first hologram grating vector. A device for reflecting light is disclosed. The device may include a grating medium and a grating structure within the grating medium. The grating medium may include a dispersion compensated hologram.

21 Claims, 7 Drawing Sheets

(51) Int. Cl.
*G02B 6/293* (2006.01)
*G02B 6/34* (2006.01)

(56) References Cited

U.S. PATENT DOCUMENTS

| | | | |
|---|---|---|---|
| 6,525,847 B2 | 2/2003 | Popovich et al. | |
| 7,418,170 B2 * | 8/2008 | Mukawa | G02B 27/0172 385/31 |
| 7,502,168 B2 * | 3/2009 | Akutsu | G02B 5/1861 359/15 |
| 7,764,413 B2 | 7/2010 | Levola | |
| 8,160,411 B2 | 4/2012 | Levola et al. | |
| 8,233,204 B1 | 7/2012 | Robbins et al. | |
| 8,446,675 B1 | 5/2013 | Wang et al. | |
| 8,665,178 B1 | 3/2014 | Wang | |
| 8,903,207 B1 | 12/2014 | Brown et al. | |
| 9,075,184 B2 | 7/2015 | Popovich et al. | |
| 9,341,846 B2 | 5/2016 | Popovich et al. | |
| 9,436,158 B2 | 9/2016 | Kostuk et al. | |
| 9,456,744 B2 | 10/2016 | Popovich et al. | |
| 10,394,029 B2 * | 8/2019 | Ayres | G02B 5/18 |
| 10,509,153 B2 * | 12/2019 | Urness | G02B 6/0028 |
| 2013/0250430 A1 | 9/2013 | Robbins et al. | |
| 2014/0140654 A1 | 5/2014 | Brown et al. | |
| 2015/0277375 A1 * | 10/2015 | Large | G02B 27/0081 250/214 AL |
| 2015/0309264 A1 * | 10/2015 | Abovitz | G02B 6/32 385/33 |
| 2016/0154150 A1 | 6/2016 | Simmonds et al. | |
| 2017/0031160 A1 | 2/2017 | Popovich et al. | |
| 2017/0276940 A1 | 9/2017 | Popovich et al. | |
| 2018/0143426 A1 | 5/2018 | Ayres et al. | |
| 2019/0094981 A1 | 3/2019 | Bradski et al. | |

* cited by examiner

DISPERSION COMPENSATION

CROSS-REFERENCE TO RELATED PATENT APPLICATIONS

This application claims priority from U.S. Application No. 62/424,290, filed 18 Nov. 2016, and titled "SKEW MIRROR DISPERSION COMPENSATION." The above application is incorporated herein by reference for all purposes, in its entirety.

FIELD OF TECHNOLOGY

The present disclosure relates generally to optical devices, and more specifically to dispersion compensation methods for optical reflective devices comprising holographic optical elements.

BACKGROUND

Dispersion may cause chromatic aberrations in optical devices. These chromatic aberrations can have a degrading effect on an image of an optical reflective device. Accordingly, improved methods for correcting the effects of dispersion and optical reflective devices that mitigate the degrading effects of dispersion on reflected images are desired.

SUMMARY

The described features generally relate to one or more improved methods, systems, or devices for performing dispersion compensation. Holograms may be implemented within optical media as holographic optical elements. A holographic optical element may be substantially achromatic, sustaining a reflective angle independent of the wavelength of incident light. These holographic optical elements may be used in an optical device (e.g., an optical reflective device). Light traversing certain dispersion boundaries (e.g., air-to-projection coupling element, air-to-waveguide substrate, air-to-waveguide grating medium, waveguide substrate-to-air, waveguide grating medium-to-projection coupling element, waveguide grating medium-to-coupling element, etc.) of the optical device may be exhibit waveform separation across disparate frequencies of the light.

A dispersion relationship between an index of refraction of one medium and an index of refraction of another medium for disparate frequencies may be used in techniques to compensate for chromatic dispersion of light in the optical device. Dispersion compensation techniques using the dispersion relationship may be applied to determine holograms that compensate for the chromatic dispersion effects of certain dispersion boundaries. A resulting holographic optical element may substantially approximate desired achromaticity associated with use of the holographic optical element in an optical device and/or a particular operating environment (e.g., where projection optics are used, where edge coupling is used, and/or in a fluid medium such as air or water).

A method of dispersion compensation in an optical device is described. The method may include identifying a first hologram grating vector of a grating medium of the optical device, the first hologram grating vector corresponding to a first wavelength of light, determining a probe hologram grating vector corresponding to a second wavelength of light different from the first wavelength of light, and determining a dispersion-compensated second hologram grating vector based at least in part on the probe hologram grating vector and the first hologram grating vector.

An apparatus for providing dispersion compensation in an optical device is described. The apparatus may be configured include a processor, memory in electronic communication with the processor, and instructions stored in the memory. The instructions may be operable to cause the processor to identify a first hologram grating vector of a grating medium of the optical device, the first hologram grating vector corresponding to a first wavelength of light, determine a probe hologram grating vector corresponding to a second wavelength of light different from the first wavelength of light, and determine a dispersion-compensated second hologram grating vector based at least in part on the probe hologram grating vector and the first hologram grating vector.

A non-transitory computer-readable medium for a method of dispersion compensation in an optical device is described. The non-transitory computer-readable medium may include instructions operable to cause a processor to identify a first hologram grating vector of a grating medium of the optical device, the first hologram grating vector corresponding to a first wavelength of light, determine a probe hologram grating vector corresponding to a second wavelength of light different from the first wavelength of light, and determine a dispersion-compensated second hologram grating vector based at least in part on the probe hologram grating vector and the first hologram grating vector.

Some examples of the method, apparatus, and non-transitory computer-readable medium described above may further include processes, features, means, or instructions for calculating a first external incident wave vector associated with a first light refracting path of the optical device and a first external reflected wave vector associated with a second light reflected path of the optical device.

In some examples of the method, apparatus, and non-transitory computer-readable medium described above, the first external incident wave vector and the first external reflected wave vector correspond to a Bragg-matching condition of the first hologram grating vector at the first wavelength of light.

In some examples of the method, apparatus, and non-transitory computer-readable medium described above, the determining a probe hologram grating vector comprises: determining the probe hologram grating vector such that an external incident probe wave vector associated with the first light refracting path may be parallel to the first external incident wave vector and an external reflected probe wave vector associated with the second light refracting path may be parallel to the first external reflected wave vector.

In some examples of the method, apparatus, and non-transitory computer-readable medium described above, the optical device comprises one or more optical elements included in at least one of the first light refracting path or the second light refracting path, each of the one or more optical elements having a corresponding an index of refraction that changes with wavelength of light at a different rate than an index of refraction of the grating medium.

In some examples of the method, apparatus, and non-transitory computer-readable medium described above, the first light refracting path includes a surface portion of the a first optical element of the one or more optical elements.

In some examples of the method, apparatus, and non-transitory computer-readable medium described above, the second light refracting path includes a surface portion of the a second optical element different from the first optical element.

In some examples of the method, apparatus, and non-transitory computer-readable medium described above, an index of refraction associated with an environmental medium included in at least one of the first light refracting path or the second light refracting path changes with wavelength of light at a different rate than an index of refraction of the grating medium.

In some examples of the method, apparatus, and non-transitory computer-readable medium described above, the determining a dispersion-compensated second hologram grating vector comprises: determining the dispersion-compensated second hologram grating vector based at least in part on a dispersion relationship corresponding to the probe hologram grating vector and the first hologram grating vector.

In some examples of the method, apparatus, and non-transitory computer-readable medium described above, the determining a dispersion-compensated second hologram grating vector comprises: determining the dispersion-compensated second hologram grating vector based at least in part on a first vector difference between the probe hologram grating vector and the first hologram grating vector.

In some examples of the method, apparatus, and non-transitory computer-readable medium described above, the determining a dispersion-compensated second hologram grating vector comprises: determining the dispersion-compensated second hologram grating vector based at least in part on the first vector difference and an absolute value of a second vector difference between second hologram grating vector and the first hologram grating vector.

In some examples of the method, apparatus, and non-transitory computer-readable medium described above, the second wavelength of light may be incrementally different from the first wavelength of light.

In an embodiment, a device or system may include the grating structure comprising a dispersion compensated hologram configured to reflect light of a first wavelength about a reflective axis offset from a surface normal of the grating medium at a first internal incidence angle and to reflect light of a second wavelength incrementally different from the first wavelength about the reflective axis offset from the surface normal of the grating medium at a second incidence angle, wherein a color separation angle between the first wavelength and the second wavelength of external reflected light of the device corresponding to a same external incidence angle for light of the first wavelength and light of the second wavelength is equal to or less than 0.050°.

In some examples of the device or system described above, a color separation angle between the first wavelength and the second wavelength of external reflected light of the device corresponding to a same external incidence angle for light of the first wavelength and light of the second wavelength may be equal to or less than 0.017°.

In some examples of the device or system described above, an optical element included in a light refracting path associated with the dispersion compensated hologram, the optical element having an index of refraction that changes with wavelength of light at a different rate than an index of refraction of the grating medium.

Some examples of the device or system described above may also include lighting of first wavelength and light of the second wavelength correspond to light of a same color band.

In some examples of the device or system described above, a first substrate and a second substrate structured to form a waveguide in which the grating medium may be disposed.

In some examples of the device or system described above, a projection optic operatively coupled to a waveguide in which the grating medium may be disposed.

In some examples of the device or system described above, the grating medium may be at least 70 μm thick, and the dispersion compensated holograms may be a volume hologram.

In some examples of the undefined described above, the dispersion compensated holograms may be structured to be Bragg-matched for at least some internal incidence angles for light of the first wavelength and light of the second wavelength within a total internal reflectance (TIR) range with respect a first axis corresponding to a surface normal of a waveguide in which the grating medium may be disposed.

In some examples of the undefined described above, the dispersion compensated holograms may be structured to be Bragg-mismatched for at least some internal incidence angles for light of the first wavelength and light of the second wavelength within a total internal reflectance (TIR) range with respect a first axis corresponding to a surface normal of a waveguide in which the grating medium may be disposed.

BRIEF DESCRIPTION OF THE DRAWINGS

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
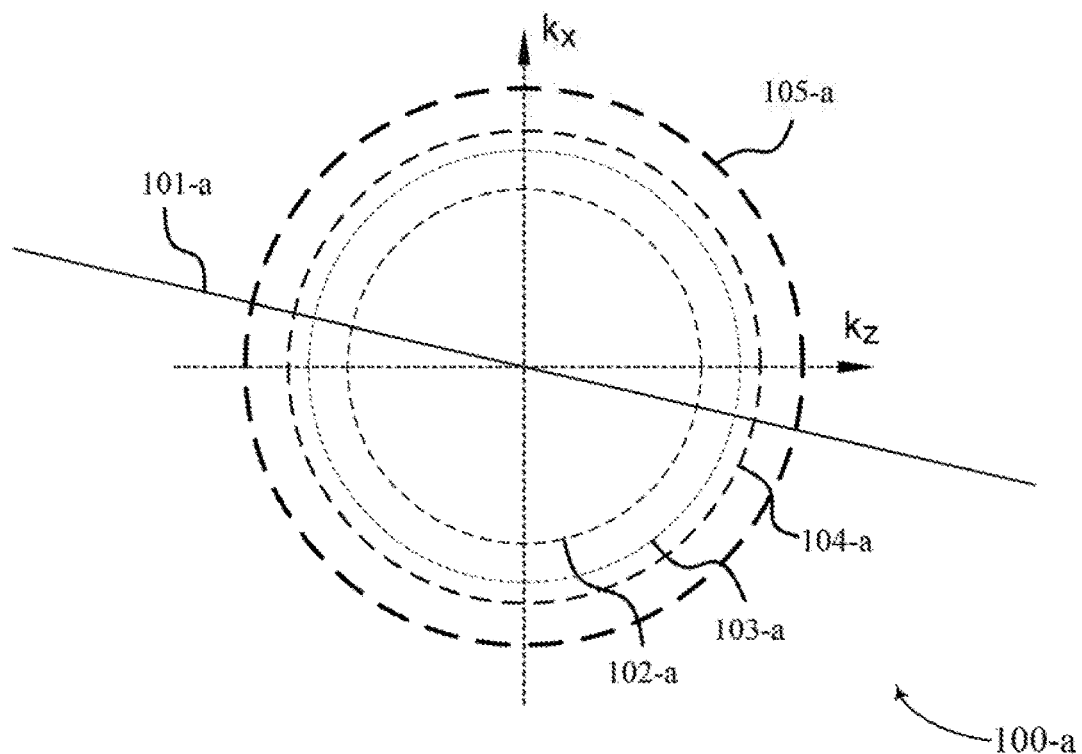
FIG. 1A illustrates a holographic optical element in k-space that supports dispersion compensation techniques in accordance with various aspects of the disclosure.

Holographic optical elements may be constructed from a recording medium. For example, a holographic optical element may be fabricated by deposition of a liquid medium mixture on or in the substrate structure, whereupon polymerization of matrix precursors within the medium mixture results in formation of a matrix polymer, which characterizes transition of the medium mixture to become a recording medium. The recording medium may be disposed between substrates and oriented for recording holograms on the recording medium.

Holograms may be recorded using techniques to compensate for chromatic dispersion. In some examples, dispersion may be compensated by sequentially deviating a distributive path (e.g., k-space distribution path) of reflective recordings from a theoretical ideal (e.g., line-segment distributive pattern). Holograms may be recorded in accordance with characteristics (e.g., angles of recording beams with respect to surface normal of the recording medium for writing the holograms) that are represented by the deviated locales designated by k-space formalisms. The sequential deviations may correspond to an achromatic path of an optical reflective device that includes volume holograms recorded in the recording medium. A recording medium including volume holograms recorded therein can be referred to as a grating medium. The sequential deviations may be determined based at least in part on an internal incident wave vector and a corresponding reflected wave vector for an incremental wavelength (e.g., a probe wave) in association with Snell's law applied to one or more dispersion boundaries.

In this manner, dispersion compensation techniques may be applied to an optical reflective device to correct for chromatic dispersion that typically occurs at a boundary between materials having refractive indices that differ from each other. Optical element may include substrates, grating mediums, coupling optics, and projection optics, for example. In some cases, an index of refraction for a first optical element may change with wavelength of light at a different rate than an index of refraction for a second optical element changes with wavelength of light. In some cases, an index of refraction for a first optical element may change with wavelength of light at a different rate than an index of refraction for an environmental medium (e.g., a fluid medium such as air or water) changes with wavelength of light. The differing rates that an index of refraction changes with wavelength of light is an example of a dispersion relationship that may be used to compensate for dispersion in an optical reflective device. In some implementations, a resulting image projection may be a substantially achromatic ("mirror-like") reflection effectively eliminating color separation and residual optical aberrations.

A holographic optical element with holograms recorded using dispersion compensation techniques described herein may support achromaticity for a plurality of wavelengths of light. Achromaticity may be supported among wavelengths of light corresponding to different color bands as well as wavelengths of light within a particular color band. In some examples, one or both of an incident wave vector and a reflected wave vector may be analyzed with respect to wave beams of light external to a holographic optical element. For example, an external incident wave vector associated with a first dispersion boundary (e.g., light of a wavelength propagating in air incident on a substrate of a holographical optical element) corresponding to a first reflected light path and an external reflected wave vector associated with the first dispersion boundary (e.g., reflected light of the wavelength propagating in air from the substrate and where the light was reflected by a grating medium of the holographical optical element) corresponding to a second reflected light path may be analyzed in accordance to Snell's law to determine the dispersion relationship that may be used to compensate for dispersion of the holographical device. In another example, an external incident wave vector associated with a first dispersion boundary (e.g., light of a wavelength propagating in air incident on a projection optic of an optical reflective device that includes a holographical element) corresponding to a first reflected light path and an external reflected wave vector associated with a second dispersion boundary (e.g., reflected light of the wavelength propagating in air from a substrate of the holographical element and where the light was reflected by a grating medium of the holographical element) corresponding to a second reflected light path may be analyzed in accordance to Snell's law to determine the dispersion relationship that may be used to compensate for dispersion in the optical reflective device.

Accordingly, chromatic dispersion associated with material properties of the holographic optical element (e.g., a grating medium within contained substrate surface materials) or exogenous sources operatively coupled with the holographic optical element (e.g., projection optics) may invoke reflective deviations from the achromatic ideal of a holographical optical element. Based at least in part on the dispersion relationship of these material properties of one or more optical element and/or fluid medium properties, chromatic dispersion may be compensated for within the holographic optical element, by sequentially deviating the distributive path (e.g., k-space distribution path) of reflective recordings from the theoretical ideal. The theoretical ideal may correspond to a substantially straightline segment. The sequential deviations to the distributive path may aggregate to a slight arching or displacement to the distributive pattern, referred to as an achromatic path of the holographic optical element. The achromatic path may be specific to the function of the holographic programming and in association with the substrate properties of the holographic optical element.

For example, in reference to a starting hologram recording (i.e., characteristics or parameters of hologram to be recorded in a recording medium), the Bragg-matched internal incident wave vector and internal reflected wave vector with respect to a grating medium (i.e., formed by a recording medium) of a holographic optical element may be calculated for the associated wavelength of the starting hologram recording. A corresponding external incident wave vector and external reflected wave vector may be calculated, based at least in part on the material properties of the holographic optical element and a corresponding dispersion boundary, using Snell's law. An incremented permutation to the wavelength associated with the starting hologram recording may be performed. In some examples, an external incident probe wave vector (e.g., corresponding to a probe beam simulation) incident to a first dispersion boundary and an external reflected probe wave vector reflected out of a second dispersion boundary may be analyzed. The external incident probe wave vector and external reflected probe wave vector may be parallel to the respective external incident wave vector and external reflected wave vector of the starting hologram recording.

A dispersion compensated probe hologram recording that provides a Bragg-matched reflection of internal incident wave vector and internal reflected wave vector may be determined for the external incident probe wave vector and external reflected probe wave vector. The determined dispersion compensated probe hologram recording may be achromatic in external angle space with respect the starting hologram recording over the wavelength increment. In some examples, the wavelength increment may be less than approximately 10% of the total spectrum of light from an potential light source (e.g., a light emitting diode (LED) for a particular color band). A vector associated with the k-space difference (e.g., a frequency difference) between the starting hologram recording and the dispersion compensated probe beam hologram recording may be substantially parallel to the achromatic path of the holographic optical element. As disclosed herein, chromatic dispersion may then be corrected for a subsequent uncompensated hologram recording by replacing the oriented locale of the subsequent uncompensated hologram recording in the normalized vector direction associated with the spatial difference, while sustaining the configured perturbation distance to determine a subsequent uncompensated hologram recording that may be used in a recording process of the holographical optical element.

The aforementioned process and other related processes described herein may be repeated for a plurality of remaining subsequent uncompensated hologram recordings. Prior to actual recording of holograms, each subsequent hologram recording may be oriented and configured in association with the directly preceding hologram recording, subject to a wavelength increment. As a result, each hologram recording subsequent to the starting hologram recording may generally deviate from the theoretically ideal distribution path, while promoting achromaticity within the holographic optical element.

In some implementations, the compensation method may correct the linear component of an implied dispersion curve associated with the holographic optical element. The corrected linear component may be selected to provide compensating deviations over a broad range, such as the entire visible spectrum. Alternatively, the dispersion may be evaluated in a granular manner, for one or more narrow bandwidth sub-ranges. A resulting image projection provided by an optical reflective device comprising a holographic optical element having one or more dispersion compensated holograms may be a substantially achromatic ("mirror-like") reflection effectively eliminating color separation and residual optical aberrations.

Accordingly, optical reflective devices comprising holographic optical elements having one or more dispersion compensated holograms may be employed in various optical applications such as, but not limited to, light coupling devices (e.g., input couplers, output couplers, cross couplers, etc.). Utilizing the subject holographic optical element technology in the one or more light coupling devices may improve viewing capability and optical clarity of an associated image projection.

The aforementioned description provides examples, and is not intended to limit the scope, applicability or configuration of implementations of the principles described herein. Rather, the ensuing description will provide those skilled in the art with an enabling description for implementing implementations of the principles described herein. Various changes may be made in the function and arrangement of elements.

Thus, various implementations may omit, substitute, or add various procedures or components as appropriate. For instance, it should be appreciated that the methods may be performed in an order different than that described, and that various steps may be added, omitted or combined. Also, aspects and elements described with respect to certain implementations may be combined in various other implementations. It should also be appreciated that the following systems, methods, devices, and software may individually or collectively be components of a larger system, wherein other procedures may take precedence over or otherwise modify their application.

FIG. 1A illustrates a k-space representation 100-$a$ of a holographic optical element. The k-space distributions of spatially varying refractive index components are typically denoted $\Delta n(\bar{k})$. $\Delta n(\bar{k})$ k-space distribution 101-$a$ passes through the origin, and has an angle measured with respect to the $k_z$-axis, equal to that of the internal reflective axis of the holographic optical element. Recording k-sphere 105-$a$ is the k-sphere corresponding to a particular holographic recording wavelength. K-space 100-$a$ may include various k-spheres (e.g., 102-$a$, 103-$a$, 104-$a$) corresponding to wavelengths of light residing in the red, green, and blue regions of the visible spectrum.

The k-space formalism is a method for analyzing holographic recording and diffraction. In k-space, propagating optical waves and holograms are represented by three dimensional Fourier transforms of their distributions in real space. For example, an infinite collimated monochromatic reference beam can be represented in real space and k-space by equation (1):

$$E_r(\bar{r}) = A_r \exp(i\bar{k}_r \cdot \bar{r}) \xrightarrow{\mathcal{J}} E_r(\bar{k}) = A_r \delta(\bar{k} - \bar{k}_r), \tag{1}$$

where $E_r(\bar{r})$ is the optical scalar field distribution at all $\bar{r}=\{x,y,z\}$ 3D spatial vector locations, and its transform $E_r(\bar{k})$ is the optical scalar field distribution at all $\bar{k}=\{k_x,k_y,k_z\}$ 3D spatial frequency vectors. $A_r$ is the scalar complex amplitude of the field; and $\bar{k}_r$ is the wave vector, whose length indicates the spatial frequency of the light waves, and whose direction indicates the direction of propagation. In some implementations, all beams are composed of light of the same wavelength, so all optical wave vectors must have the same length, i.e., $|\bar{k}_r|=k_n$. Thus, all optical propagation vectors must lie on a sphere of radius $k_n=2\pi n_0/\lambda$, where $n_0$ is the average refractive index of the hologram ("bulk index"), and $\lambda$ is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms usually consist of spatial variations of the index of refraction within a recording medium. The index of refraction spatial variations, typically denoted $\Delta n(\bar{r})$, can be referred to as index modulation patterns, the k-space distributions of which are typically denoted $\Delta n(\bar{k})$. The index modulation pattern created by interference between a first recording beam and a second recording beam is typically proportional to the spatial intensity of the recording interference pattern, as shown in equation (2):

$$\Delta n(\bar{r}) \propto |E_1(\bar{r})+E_2(\bar{r})|^2 = |E_1(\bar{r})|^2+|E_2(\bar{r})|^2+E^*_1(\bar{r})E_2(\bar{r})+E_1(\bar{r})E^*_2(\bar{r}), \tag{2}$$

where $E_1(\bar{r})$ is the spatial distribution of the first recording beam field and $E_2(\bar{r})$ is the spatial distribution of the second recording beam field. The unary operator "*" denotes complex conjugation. The final term in equation (2), $E_1(\bar{r})E^*_2(\bar{r})$, maps the incident second recording beam into the diffracted first recording beam. Thus the following equation may result:

$$E_1(\bar{r})E_2^*(\bar{r}) \xrightarrow{\Im} E_1(\bar{k}) \otimes E_2(\bar{k}), \qquad (3)$$

where $\otimes$ is the 3D cross correlation operator. This is to say, the product of one optical field and the complex conjugate of another in the spatial domain becomes a cross correlation of their respective Fourier transforms in the frequency domain.

Typically, the holographic optical element constitutes a refractive index distribution that is real-valued in real space. Locations of $\Delta n(\bar{k})$ k-space distributions of the holographic optical element may be determined mathematically from the cross-correlation operations $E_2(\bar{k}) \otimes E_1(\bar{k})$ and $E_1(\bar{k}) \otimes E_2(\bar{k})$, respectively, or geometrically from vector differences $\bar{K}_{G+} = \bar{k}_1 - \bar{k}_2$ and $\bar{K}_{G-} = \bar{k}_2 - \bar{k}_1$, where $\bar{K}_{G+}$ and $\bar{K}_{G-}$ are grating vectors from the respective hologram $\Delta n(\bar{k})$ k-space distributions to the origin (not shown individually). Note that by convention, wave vectors are represented by a lowercase "k," and grating vectors by uppercase "K."

Once holographically programmed, the holographic optical element may be illuminated by a probe beam associated with a waveform representative of a permuted wavelength from the recording wavelength of k-sphere 105-a, to produce a diffracted beam. For purposes of the present disclosure, the diffracted beam can be considered a reflection of the probe beam, which can be referred to as an incident light beam (e.g., image-bearing light). The probe beam and its reflected beam are angularly bisected by the reflective axis 101 (i.e., the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\bar{k}) \propto \Delta n(\bar{k}) * E_p(\bar{k})|_{|\bar{k}|=k_n}, \qquad (4)$$

where $E_d(\bar{k})$ and $E_p(\bar{k})$ are k-space distributions of the diffracted beam and the probe beam, respectively; and "*" is the 3D convolution operator. The notation "$|_{|\bar{k}|=k_n}$" indicates that the preceding expression is evaluated only where $|\bar{k}|=k_n$, i.e., where the result lies on the k-sphere. The convolution $\Delta n(\bar{k}) * E_p(\bar{k})$ represents a polarization density distribution, and is proportional to the macroscopic sum of the inhomogeneous electric dipole moments of the recording medium induced by the probe beam, $E_p(\bar{k})$.

Typically, when the probe beam resembles one of the recording beams used for recording, the effect of the convolution is to reverse the cross correlation during recording, and the diffracted beam will substantially resemble the other recording beam used to record a hologram.

Persons skilled in the art given the benefit of the present disclosure will recognize that the term probe beam, typically used here when describing holographic optical element properties in k-space, is analogous to the term incident light, which is typically used here when describing holographic optical element reflective properties in real space. Similarly, the term diffracted beam, typically used here when describing holographic optical element properties in k-space, is analogous to the term principal reflected light, typically used here when describing holographic optical element properties in real space. Thus when describing reflective properties of a holographic optical element in real space, it is typical to state that incident light is reflected by a hologram (or other grating structure) as principal reflected light, though to state that a probe beam is diffracted by the hologram to produce a diffracted beam says essentially the same thing. Similarly, when describing reflective properties of a holographic optical element in k-space, it is typical to state that a probe beam is diffracted by a hologram (or other grating structure) to produce a diffracted beam, though to state that incident light is reflected by the grating structure to produce principal reflected light has the same meaning in the context of implementations of the present disclosure.

Figure 1B:
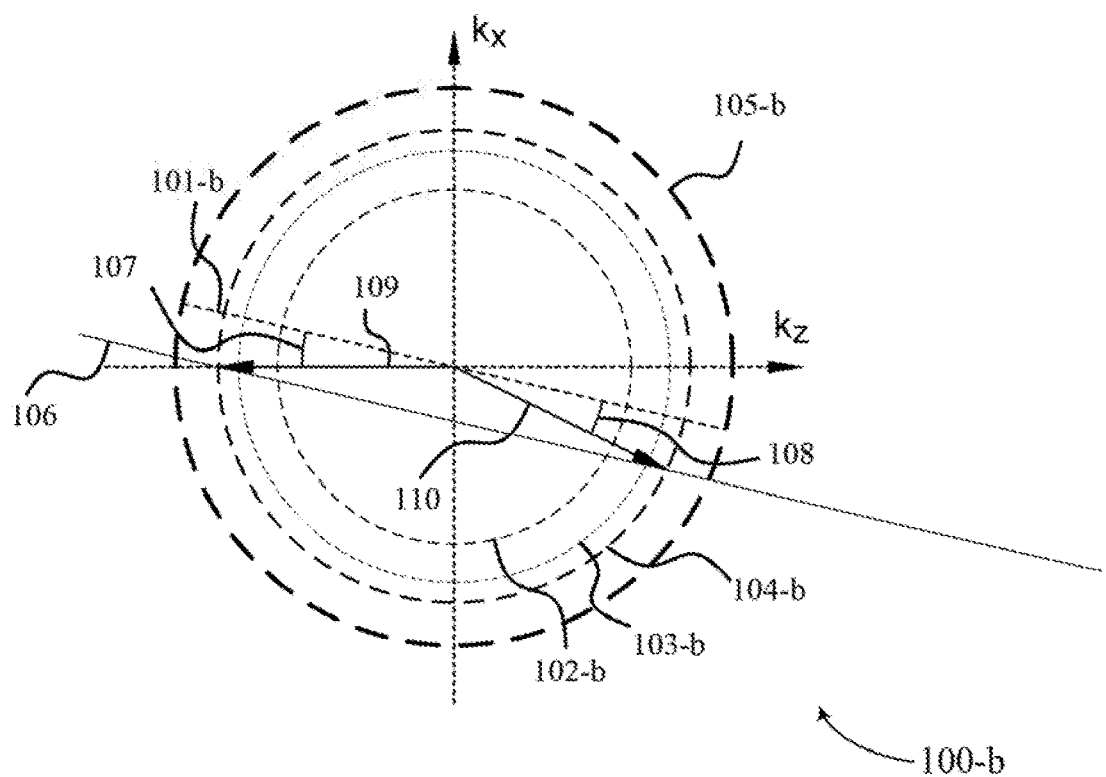
FIG. 1B illustrates a holographic optical element in k-space that supports dispersion compensation techniques in accordance with various aspects of the disclosure.

FIG. 1B illustrates a k-space representation 100-b of a holographic optical element, and may be representative of one or more features and/or methods of k-space representation 100-a of FIG. 1A. The k-space representation 100-b illustrates a geometrical construct corresponding to achromatic characteristics associated with a holographic optical element. $\Delta n(\bar{k})$ k-space distribution 101-b passes through the origin, and has an angle measured with respect to the z-axis, equal to that of the reflective axis of the holographic optical element. Recording k-sphere 105-b is the k-sphere corresponding to a particular holographic recording wavelength. K-space 100-a may include various k-spheres (e.g., 102-b, 103-b, 104-b) corresponding to wavelengths of light residing in the red, green, and blue regions of the visible spectrum.

Illumination of the holographic optical element by an incident beam (e.g., probe beam) representative of the incident wave vector 110 may produce a polarization density distribution 106. The probe beam has a k-space distribution, $E_p(\bar{k})$, that is point-like, in association with the polarization density distribution 106. Polarization density distribution 106 resembles $\Delta n(\bar{k})$ k-space distribution 101-b translated via the incident wave vector 110. Polarization density distribution 106 may be substantially parallel to $\Delta n(\bar{k})$ k-space distribution 101-b across the set of one or more k-spheres. The exhibited relation between polarization density distribution 106 and $\Delta n(\bar{k})$ k-space distribution 101-b may illustrate the probe beam associated with incident wave vector 110 is "Bragg-matched" to the holographic optical element. The holographic optical element may therefore employ significant diffraction to the "Bragg-matched" probe beam, despite the probe beam wavelength being disparate from the wavelengths associated with the one or more recording beams associated with the holographic optical element.

Reflected wave vector 109 may be determined according to the intersection of the polarization density distribution 106 with the probe beam k-sphere 104-b. Based at least in part on the "Bragg-matched" properties of incident wave vector 110, the law of reflectivity may be sustained for the probe beam illumination, where incidence angle 108 and reflective angle 107 may be substantially equivalent in magnitude (i.e., reference to the k-space distribution 101-b). Further, the equivalency in angular magnitude between incidence angle 107 and reflective angle 108, in association with substantial parallelism between k-space distribution 101-b and polarization density distribution 106, may promote a substantially symmetric geometric construct (e.g., isosceles triangle) via wave beams 109 and 110, and polarization density distribution 106.

Achromatic characteristics of the holographic optical element may enable a sustained angle of reflection for each respective incident beam at a given angle of incidence, independent of wavelength permutation. Specifically, each incident beam, regardless of frequency (i.e., and inherently therein wavelength) divergence from the one or more hologram recordings of the holographic optical element may independently sustain an angle of reflection in association with incidence at reflective axis 101-b. As a result, the holographic optical element may impose achromatic "mirror-like" reflection of illuminating light, spanning a range of permutated wavelengths, where incidence and reflected angles are measured with respect to the reflective axis inside the recording medium.

Figure 2:
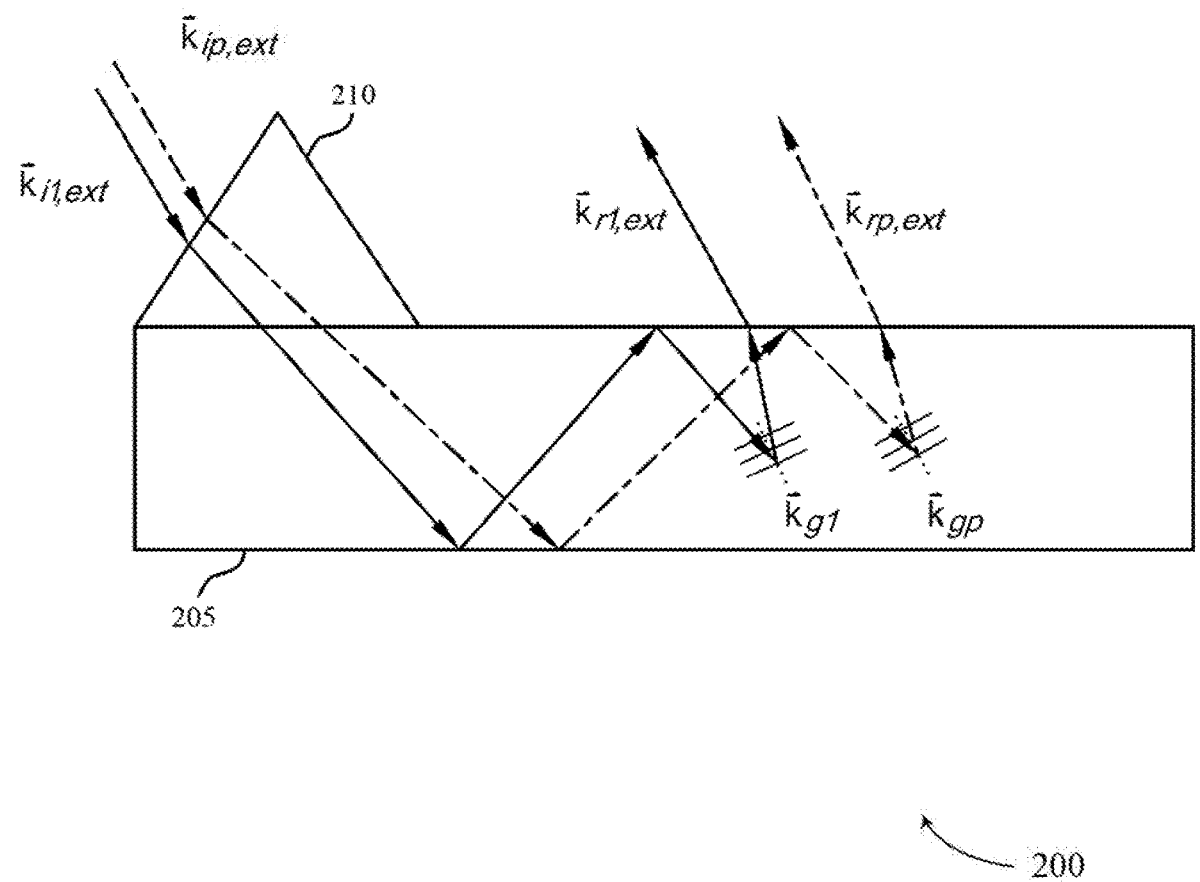
FIG. 2 is an example of an optical reflective device illustrating a method that can be used for dispersion compensation in accordance with various aspects of the disclosure.

FIG. 2 illustrates an optical reflective device 200 for performing dispersion compensation in accordance with various aspects of the present disclosure. Optical reflective device 200 may employ optical element intercoupling, as shown between holographic optical element 205 and prism 210. In some cases, optical element 205 may be representative of, or contained within, a waveguide embodiment.

Holographic optical element 205 may sustain achromatic characteristics (i.e., a sustained angle of reflection for a given angle of incidence, independent of the wavelength of the incident waveform) for all internal wave vectors employed at holographic optical element 205. In some embodiments, however, it may be desirable to implement and evaluate the features of the holographic optical element with one or both of incident and reflected wave vectors measured externally to the holographic optical element, according to Snell's law. Aberrations and/or deviated characteristics associated with, or in relation to the holographic optical element may promote dispersive properties. The dispersive properties may relate to a non-uniform refractive index difference at dispersion boundaries associated with the holographic optical element, and may be in relation to permuted wavelengths of incident waveforms. Further, the dispersive properties may invoke reflective deviations from the achromatic ideal at an external incidence and/or reflection. As a result, in accordance with embodiments of the present disclosure, dispersion may be preemptively compensated by deviating the distribution path (e.g., k-space distribution segment) from the theoretical ideal. In some cases, the theoretical ideal may correspond to a substantially straight line segment within the k-space representation of holographic optical element 205.

Compensation for dispersion may include calculating a deviation vector for each individual grating exposure (e.g., holograph incidence) prior to hologram recording at the recording medium of the holographic optical element. Each deviation may be determined via internal incidence and reflected waveform (e.g., probe wave) vectors for a wavelength incrementation, in association with Snell's law. The individualized sequential deviations to the distributive path may aggregate to a slight arching or displacement to the distributive pattern, referred to as an achromatic path of the holographic optical element. The achromatic path may be specific to the function of the holographic programming and in association with the substrate properties of the holographic optical element.

Specifically, an initial uncompensated hologram may be directed through the optical reflective device 200, and incident at the recording medium of the holographic optical element 205. The initial uncompensated hologram may employ an initial holographic recording (e.g., starting hologram recording) associated with grating vector $\overline{K}_{g1}$. The "Bragg-matched" internal incident and reflected wave vectors of the starting hologram recording may be calculated for the associated wavelength of the waveform. Based at least in part on the calculated internal wave vectors associated with the initial uncompensated hologram, and the associated grating vector $\overline{K}_{g1}$, at least one corresponding external incidence wave vector $\overline{k}_{i1,ext}$ and at least one external reflected wave vector $\overline{k}_{r1,ext}$ may be calculated. Each of the external wave vectors may be calculated via Snell's law, based at least in part on the material properties of the holographic optical element, and the dispersion boundary.

Subsequently, an incremented permutation to the reference wavelength associated with the starting hologram recording may be performed, and an associated waveform (e.g., probe beam) may be initiated incident to holographic optical element 205, characterized by at least the incremented wavelength. In some cases, the wavelength permutation may be in accordance with a pre-configured proportion of the total wavelength associated with the starting hologram recording. Additionally or alternatively, one or more additional indicators associated with at least the optical element intercoupling of optical reflective device 200 may be evaluated and incorporated for determining the wavelength permutation. The probe beam may be oriented and employed to sustain at least one external incident vector $\overline{k}_{ip,ext}$ and at least one external reflected wave vector $\overline{k}_{rp,ext}$ substantially parallel to the respective external wave vectors associated with grating vector $\overline{K}_{g1}$ (e.g., $\overline{k}_{i1,ext}$ and $\overline{k}_{r1,ext}$). Based at least in part on the sustained parallelism between external vectors, at disparate temporal instances, an orientation for a corresponding "probe" grating vector $\overline{K}_{gp}$ may be determined. $\overline{K}_{gp}$, as oriented, may direct external incident wave vector $\overline{k}_{ip,ext}$ through holographic optical element 205, for directed external reflection at external reflected wave vector $\overline{k}_{rp,ext}$. Further, $\overline{K}_{gp}$, as oriented, may correspond to an achromatic path instance of the optical reflective device 200, over the wavelength increment.

A vector associated with the k-space difference between $\overline{K}_{g1}$ and $\overline{K}_{gp}$ may be substantially parallel to the achromatic path of holographic optical element 205. As disclosed herein, dispersion may then be corrected for the subsequent hologram recording, by replacing the oriented locale of the subsequent hologram recording in the normalized vector direction associated with the k-space difference between $\overline{K}_{g1}$ and $\overline{K}_{gp}$ while sustaining the configured perturbation distance. The aforementioned process may be repeated, in sequence, for each remaining hologram recording of the holographic programming. Prior to hologram recording, each new hologram may be oriented and configured in association with the directly preceding hologram recording, subject to a wavelength increment. As a result, each hologram recording subsequent to the starting hologram recording may generally deviate from the theoretically ideal distribution path, while promoting achromaticity within the holographic optical element 205.

Figure 3:
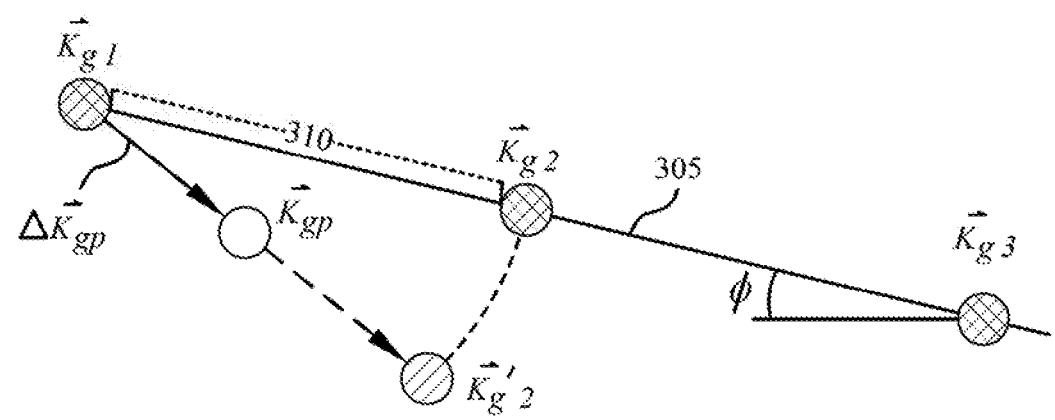
FIG. 3 is a diagram of an example method represented in k-space illustrating dispersion compensation in accordance with various aspects of the disclosure.

FIG. 3 illustrates an example of a gradient-based dispersion compensation method 300 in association with aspects of the present disclosure. Method 300 may be oriented with reference to a k-space formulism and representation, as described in the embodied features of k-space representation 100-*a* of FIG. 1A and k-space representation 100-*b* of FIG. 1B. Each holographic recording instance may be represented by a hologram grating vector $\overline{K}_g$ of a holographic optical element, such as holographic optical element 205 of FIG. 2.

A theoretically ideal (e.g., uncompensated) $\Delta n(\overline{k})$ k-space distribution 305, including an angular offset $\phi$ from surface normal, may be determined for an associated holographic optical element. The k-space distribution may span a plurality of uncompensated hologram grating vectors $\overline{K}_{g1}$ ... $\overline{K}_{gN}$, for integer values 1 through N. Dispersive properties related to a non-uniform refractive index difference at dispersion boundaries associated with the holographic optical element may result in an achromatic path divergent from the uncompensated $\Delta n(\overline{k})$ k-space distribution 305. As described herein, a distribution deviation may be determined according to the local derivative associated with the external angles of incidence and/or reflection with respect to a wavelength value. That is, compensation for dispersion may include calculating a deviation vector for each individual holograph incidence prior to hologram recording at the recording medium of the holographic optical element.

An initial holographic recording (e.g., starting hologram recording) associated with grating vector $\overline{K}_{g1}$ may be recorded at a holographic optical element. The orientation of grating vector $\overline{K}_{g1}$ may be in alignment with the uncompensated an $\Delta n(\overline{k})$ k-space distribution 305. "Bragg-matched" internal incident and reflected wave vectors of the starting hologram recording associated with grating vector $\overline{K}_{g1}$ may be calculated for the associated wavelength of the starting hologram recording waveform. Based at least in part on the calculated internal wave vectors associated with the initial uncompensated hologram, and the associated grating vector $\overline{K}_{g1}$, at least one corresponding external incidence wave vector (e.g., $\overline{k}_{i1,ext}$ of FIG. 2) and at least one external reflected wave vector (e.g., $\overline{k}_{r1,ext}$ of FIG. 2) may be calculated. Each of the external wave vectors may be calculated via Snell's law, based at least in part on the material properties of the holographic optical element, and the dispersion boundary.

Subsequently, an incremented permutation to the reference wavelength associated with the starting hologram recording may be performed, and an associated waveform (e.g., probe beam) external wave vectors (e.g., $\overline{k}_{ip,ext}$ and $\overline{k}_{rp,ext}$ of FIG. 2) may be determined. Determination of the associated wave vectors may include an orientation where the probe beam external wave vectors are substantially parallel to the external wave vectors associated with grating vector $\overline{K}_{g1}$. Based at least in part on the sustained parallelism between external wave vector $\overline{k}_{ip,ext}$ respective to external wave vector $\overline{k}_{i1,ext}$ of grating vector $\overline{K}_{g1}$, and external wave vector $\overline{k}_{rp,ext}$ respective to external wave vector $\overline{k}_{r1,ext}$ of grating vector $\overline{K}_{g1}$, with reference to FIG. 2, internal incidence and/or reflective probe wave vectors that sustain compensated achromaticity may be determined. Each of the internal probe wave vectors may be calculated via Snell's law, based at least in part on the material properties of the holographic optical element, and the dispersion boundary.

Based at least in part on the determined internal probe wave vectors, an orientation for a corresponding "probe" grating vector $\overline{K}_{gp}$ may be determined. Specifically, $\overline{K}_{gp}$ may be oriented at a location that is achromatic with reference to the external angle space associated with grating vector $\overline{K}_{g1}$, over the incremented wavelength, as configured. The vector difference $\Delta \overline{K}_{gp}$ represents an path in the neighborhood of grating vector $\overline{K}_{g1}$ that is substantially parallel to an achromatic path with reference to grating vector $\overline{K}_{g1}$. In the case of present dispersion, $\Delta \overline{K}_{gp}$ will deviate (e.g., slight arching or displacement in k-space) from the theoretically ideal uncompensated $\Delta n(\overline{k})$ k-space distribution 305, and may be referred to as a $\Delta n(\overline{k})$ k-space dispersion deviation. In some embodiments, the $\Delta n(\overline{k})$ k-space dispersion deviation may minimize or improve an error metric determined by all configured hologram recording wavelengths. Additionally or alternatively, in other embodiments, separate wavelength bands (e.g., color (RGB) bands) may be independently optimized. Further, in some embodiments, the $\Delta n(\overline{k})$ k-space dispersion deviation may aid in compensating for at least one of external incidence and reflective angles. In other embodiments, the $\Delta n(\overline{k})$ k-space dispersion deviation may aid in compensating for disparate external indices and/or dispersion of the indices themselves.

Dispersion may then be compensated within the neighborhood of $\overline{K}_{g1}$ for a subsequent hologram grating vector $\overline{K}'_{g2}$. $\overline{K}'_{g2}$ may replace the theoretical, uncompensated hologram grating vector $\overline{K}_{g2}$, as illustrated, according to a normalized vector operation applied to equation (5), as given:

$$\overline{K}'_{g2} = \overline{K}_{g1} + \Delta \overline{K}_{gp} \frac{|\overline{K}_{g2} - \overline{K}_{g1}|}{|\Delta \overline{K}_{gp}|}. \tag{5}$$

The replacement may enact alignment of hologram grating vector $\overline{K}'_{g2}$ along the achromatic path, while sustaining the configured perturbation distance 310 of the holographic programming sequence, as computed by $|\overline{K}_{g2} - \overline{K}_{g1}|$ of equation (5).

Each of the aforementioned processes may be repeated for all remaining hologram grating vectors $\overline{K}_{g2} \ldots \overline{K}_{gN}$ in sequence using the previous compensated hologram grating vector (e.g., $\overline{K}'_{(i-1)}$ for i=2 . . . N). A dispersion deviation $\Delta \overline{K}'_{gi}$ may be sequentially determined for each of the remaining grating vectors $\overline{K}_{g2} \ldots \overline{K}_{gN}$, with reference to the directly prior compensated hologram grating vector $\overline{K}'_{(i-1)}$, to determine a dispersion correction prior to hologram recording at the respective grating vector. Due to directional variance of the achromatic path throughout k-space, the resulting sequence $\overline{K}_{g1} \ldots \overline{K}'_{gN}$ may generally resemble a slightly arching and/or divergent path from the uncompensated $\Delta n(\overline{k})$ k-space distribution 305. In particular, $\overline{K}_{g1}$ will remain in its original position, but all remaining holograms $\overline{K}'_{g1} \ldots \overline{K}'_{gN}$ may deviate from their original locations.

One skilled in the art will discern that the described gradient-based dispersion compensation algorithm corrects at least the linear component of the n($\lambda$) dispersion curve. The corrected linear component may be selected to correct over a broad range, for example a best-fit line to the n($\lambda$) dispersion curve over the whole visible spectrum. In other embodiments, the local derivative may be evaluated at the center of a narrow wavelength band to provide more accurate compensation over a smaller range.

Figure 4:
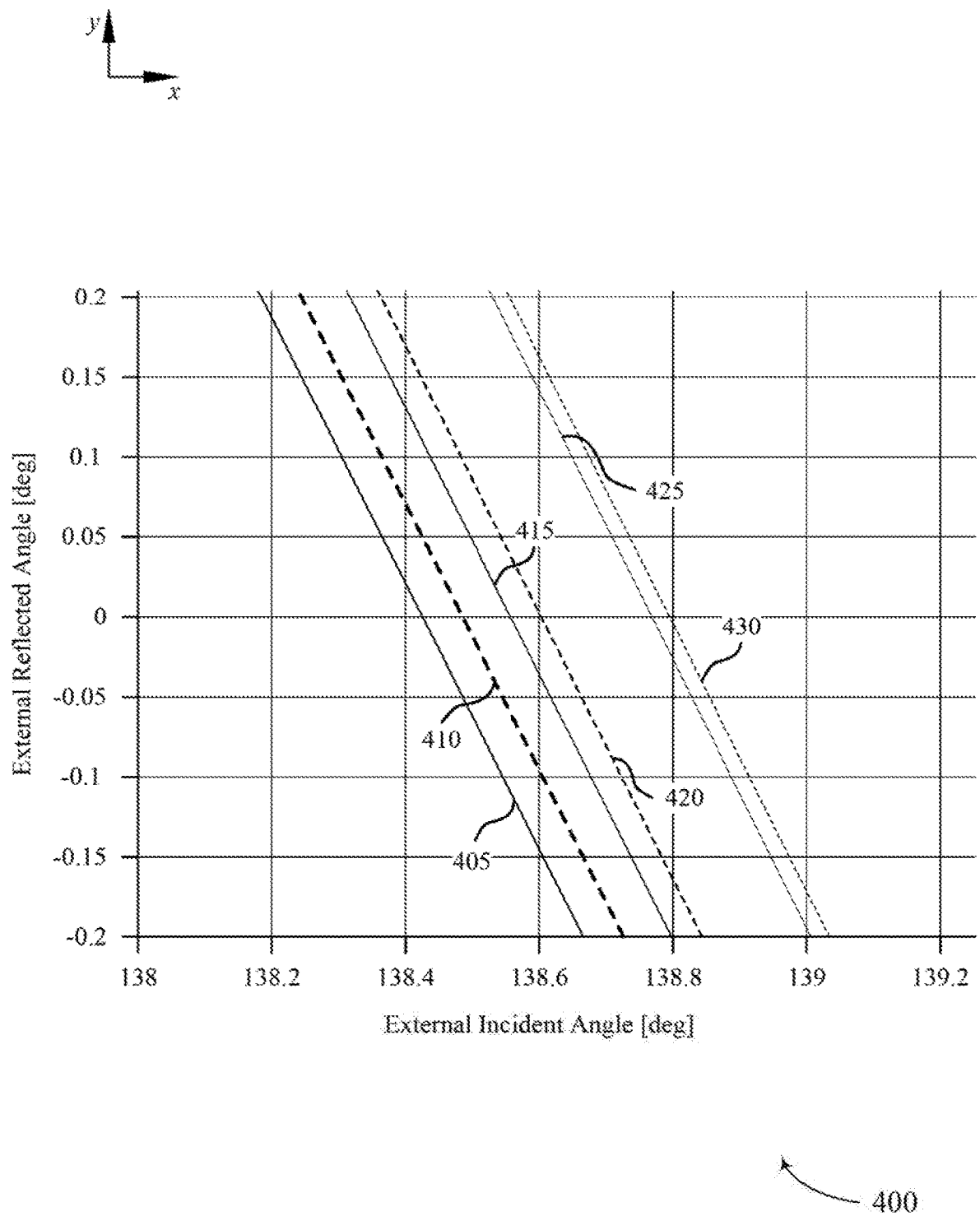
FIG. 4 is a plot that illustrates dispersion compensation techniques in accordance with aspects of the present disclosure.

FIG. 4 illustrates a plot 400 that shows simulated results for an example case of uncompensated reflective performance near the center of the field, with present dispersion. Plot 400 includes a first axis (e.g., y-axis) representing an external reflected angle measured in degrees. Plot 400 includes a second axis (e.g., x-axis) representing an external incident angle measured in degrees.

As illustrated, a holographic optical element oriented and configured to exhibit an angular offset of 13 degrees, with reference to surface normal may be preemptively compensated for each of the respective center of field color bands (e.g., RGB) using center wavelengths of 638 nanometers (nm), 522 nm, and 475 nm, respectively. The dispersion of the holographic optical element may be determined by the refractive index function, associated with a 1 nm wavelength perturbation value, and provided by equation (6):

$$n(\lambda) = 1.4905 + 5.260e3\lambda^{-2} - 4.744e7\lambda^{-4} \tag{6}$$

Uncompensated reflective performance line plots 405 and 410 generally represent reflective properties at 465 nm and 485 nm wavelengths (i.e., 405 representative of 465 nm, and 410 representative of 485 nm). The associated range medial to the displayed bandwidths (e.g., 465-485) may correspond to the effective bandwidth of an illuminated LED corresponding to blue visible light. Similarly, uncompensated reflective performance line plots 415 and 420 generally represent reflective properties at 512 nm and 532 nm wavelengths respectively. The associated range medial to the displayed bandwidths (e.g., 512-532) may correspond to the effective bandwidth of an illuminated LED corresponding to green visible light. Furthermore, uncompensated reflective performance line plots 425 and 430 generally represent reflective properties at 628 nm and 648 nm wavelengths respectively. The associated range medial to the displayed bandwidths (e.g., 628-648) may correspond to the effective bandwidth of an illuminated LED corresponding to red visible light.

As evidenced by the representative line plots inset at plot 400, each pair of uncompensated reflective performance line plots for a visible light RGB characterization experience statistically significant displacement in angle of reflection, for a static angle of incidence. The statistically significant displacement is representative of the dispersion magnitude, and therefore the observed color separation exhibited by an uncompensated holographic optical element. As illustrated, displacement within green and red visible light bands is lesser than blue visible light, albeit still statistically significant.

Figure 5:
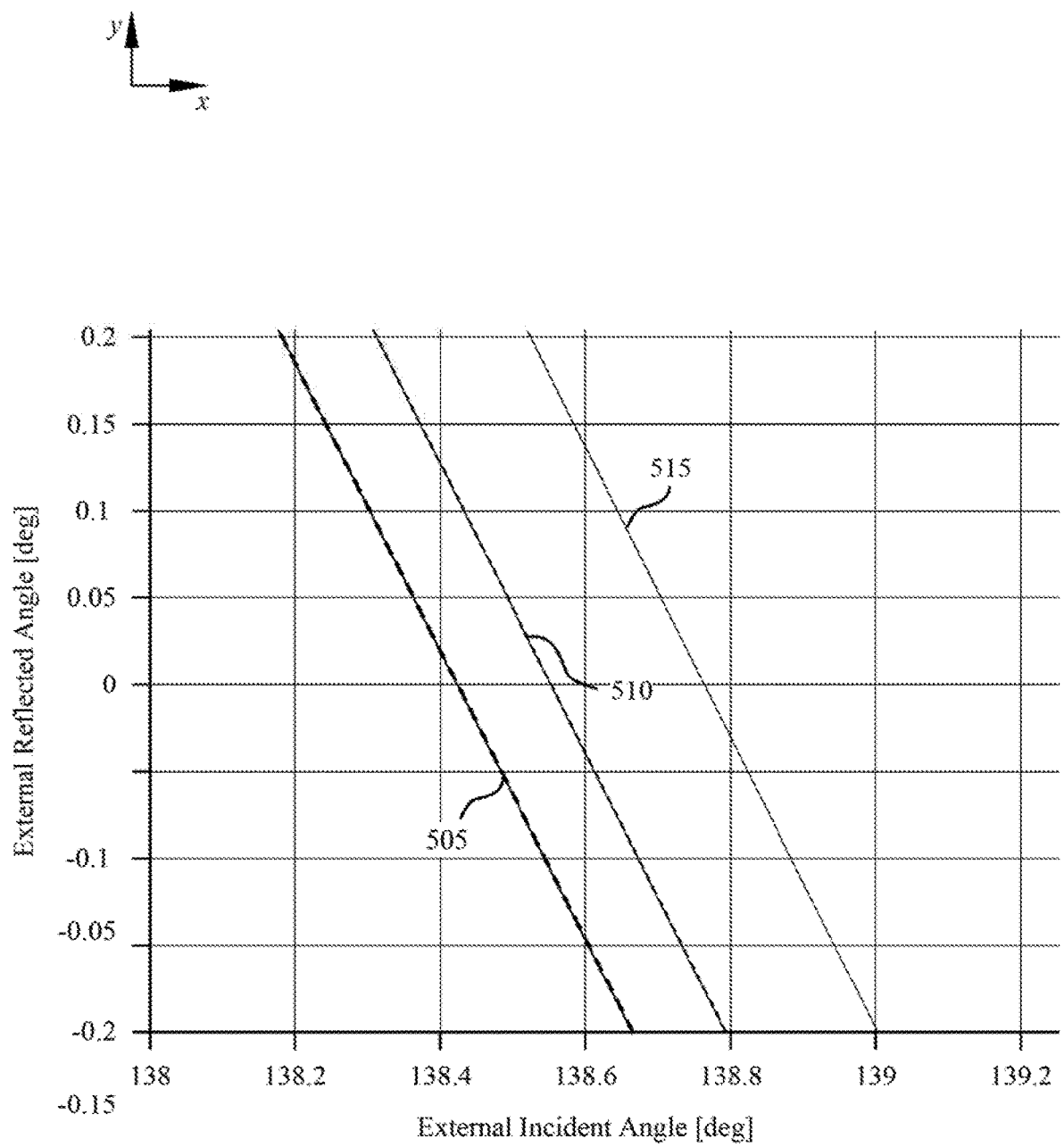
FIG. 5 is a plot that illustrates dispersion compensation techniques in accordance with aspects of the present disclosure.

FIG. 5 illustrates a plot 500 that shows simulated results for an example case of compensated reflective performance near the center of the field, with present dispersion. Plot 500 includes a first axis (e.g., y-axis) representing an external reflected angle measured in degrees. Plot 500 includes a second axis (e.g., x-axis) representing an external incident angle measured in degrees. Plot 500 may exhibit compensation properties at the visible light wavelength range values, as described at FIG. 4.

As illustrated, compensated reflective performance line plot 505 may exhibit substantial overlap of 465 nm and 485 nm wavelengths associated with blue visible light for LED illumination. The amount of displacement in angle of reflection, and therefore color separation, is now substantially insignificant and below the resolution threshold of the human eye (e.g., approximately 0.017 degrees). Similarly compensated reflective performance line plots 510 and 515 are effectively coincident, as illustrated, generally conveying substantially insignificant displacement in angle of reflection, corresponding to undetectable color separation for green and red visible light. Any remaining offset between each of the compensated reflective performance line plots 515, 510, and 505, corresponding to red, green, and blue visible light, can be pre-compensated with projection color plane shifts.

Figure 6:
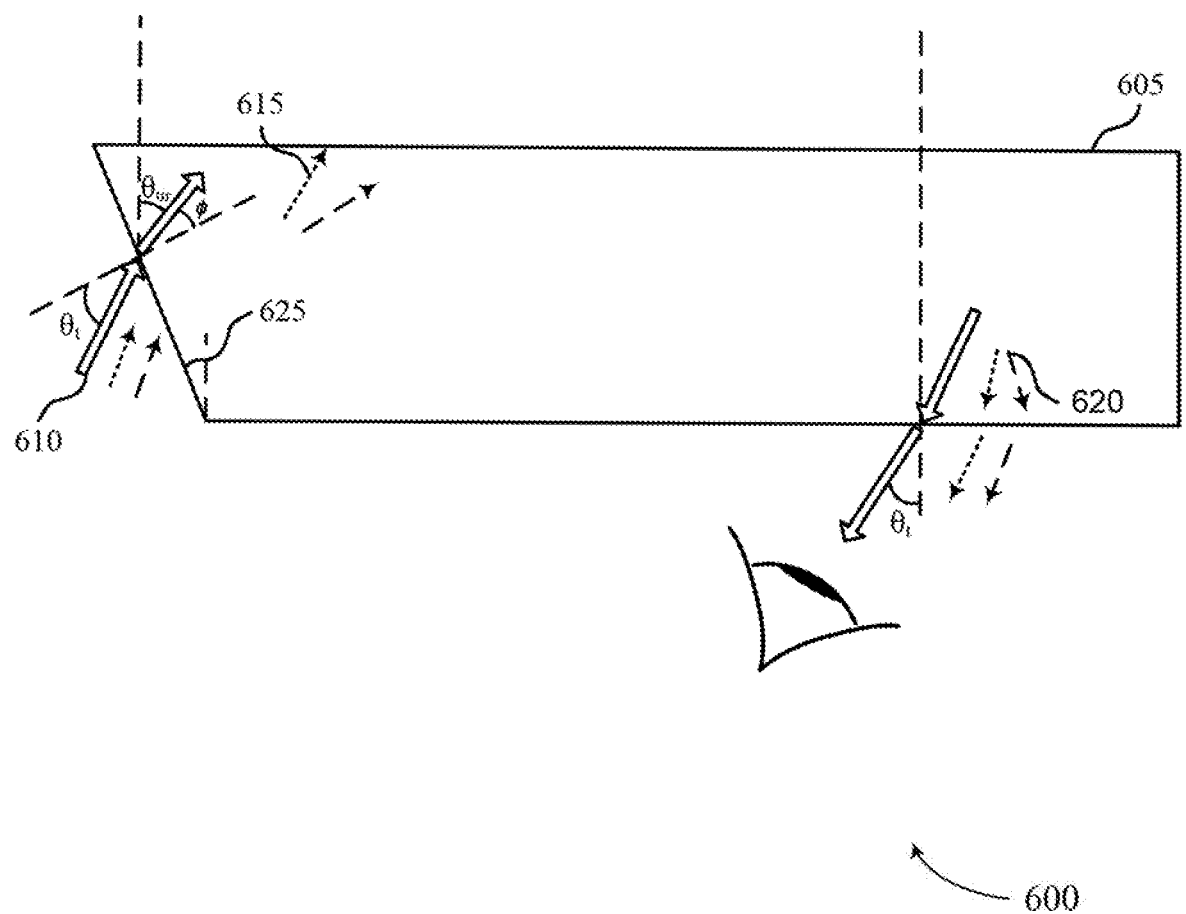
FIG. 6 is an example of a waveguide configuration illustrating a method that can be used for dispersion compensation in accordance with various aspects of the present disclosure

FIG. 6 illustrates an example of a waveguide configuration 600, including an edge facet for optical element intercoupling, that supports symmetric facet dispersion compensation method in accordance with aspects of the present disclosure. The features of waveguide configuration 600 may support dispersion compensation without implementing a Δn(k) k-space dispersion deviation.

As illustrated, a reflected light beam (e.g., mode) may exit the waveguide 605 at a desired external tilt angle $\theta_T$ with respect to waveguide normal in association with the eye. External tilt angle $\theta_T$ corresponds to an internal tilt angle $\phi$, provided via Snell's law, of an incident mode reflected by the holographic optical element, and represented by the incident vector 610. The internal angle of the mode incident to the skew mirror, $\theta_{TIR}$, may be determined by an axis associated with the characterized properties of the holographic optical element and corresponding to an angular offset, with reference to surface normal (e.g., skew axis).

If, in the case that the edge facet is angularly offset from surface normal by 90°-$\theta$TIR-$\alpha$ as illustrated at 625, the external incidence angle of the mode with respect to the edge facet will also be $\theta_T$, so that any chromatic aberration introduced by the edge facet will be precisely reversed as the mode is reflected and subsequently exits the configured waveguide 305. Further, as illustrated, by granular modes 615 and 620, shorter wavelengths may exhibit larger directional orientation changes (e.g., bending) at each refraction, promoting parallel departure modes from parallel incident modes.

Figure 7:
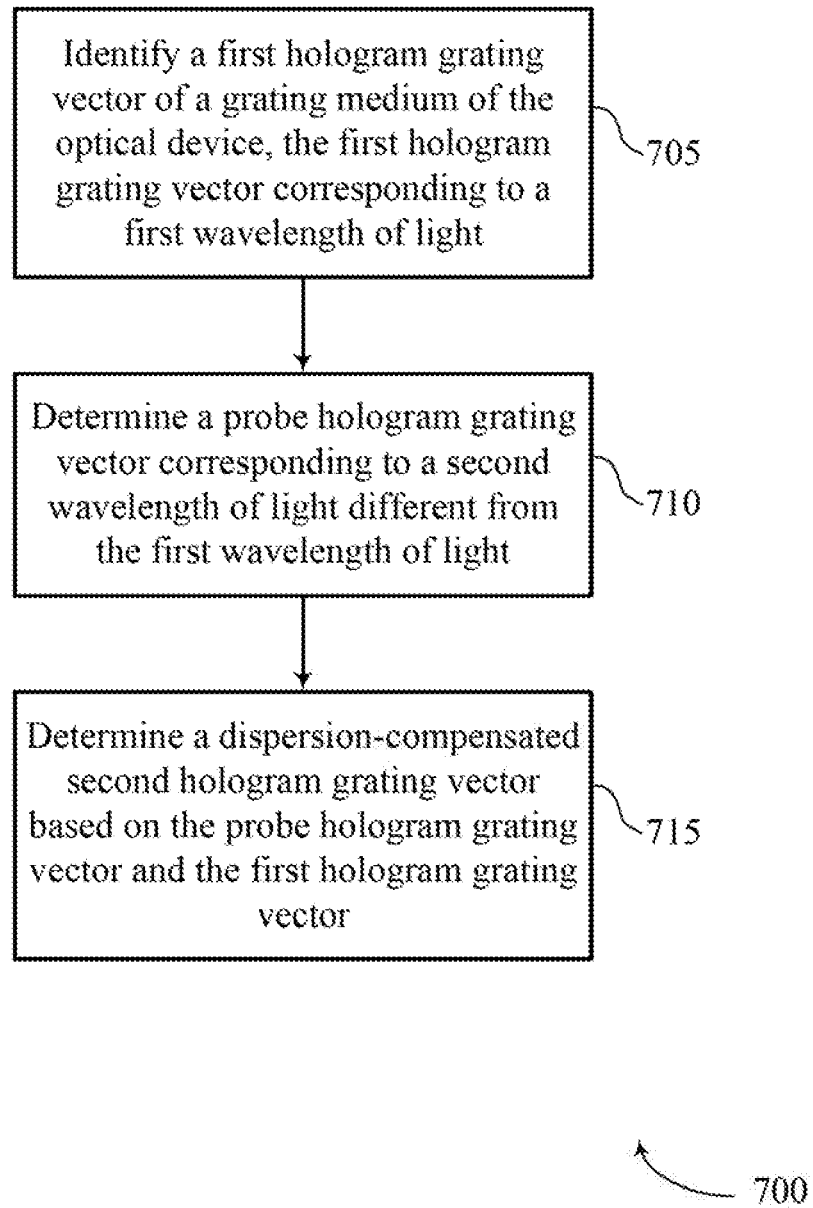
FIG. 7 is a flow chart illustrating an example of a dispersion compensation method in accordance with various aspects of the present disclosure.

Symmetric facet dispersion compensation may work for all field angles, both incident to and departing from the figure plane, due to sustained symmetry between the incident and exiting angles. Similarly symmetric facet dispersion compensation may prevent the introduction of field distortion due to sustained symmetry between the incident and exiting angles FIG. 7 shows a flowchart illustrating a method 700 for undefined in accordance with aspects of the present disclosure. The operations of method 700 may be implemented by an apparatus or computer having on one or more processors that employ any one of a variety of operating systems or platforms as described herein. Additionally or alternatively, aspects of the functions described below may be performed using special-purpose hardware.

At 705, the apparatus or computer may identify a first hologram grating vector of a grating medium of the optical device. In some cases, the first hologram grating vector corresponding to a first wavelength of light. The operations of 705 may be performed according to the dispersion compensation techniques described herein. In certain examples, aspects of the operations of 705 may be performed as described with reference to FIGS. 1 through 6.

At 710 apparatus or computer may determine a probe hologram grating vector corresponding to a second wavelength of light different from the first wavelength of light. The operations of 710 may be performed according to the dispersion compensation techniques described herein. In certain examples, aspects of the operations of 710 may be performed as described with reference to FIGS. 1 through 6.

At 715 the apparatus or computer may determine a dispersion-compensated second hologram grating vector based at least in part on the probe hologram grating vector and the first hologram grating vector. The operations of 715 may be performed according to the dispersion compensation techniques described herein. In certain examples, aspects of the operations of 715 may be performed as described with reference to FIGS. 1 through 6.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

In some options, the apparatus or computer may calculate a first external incident wave vector associated with a first light refracting path of the optical device and a first external reflected wave vector associated with a second light reflected path of the optical device. In some options, the first external incident wave vector and the first external reflected wave vector correspond to a Bragg-matching condition of the first hologram grating vector at the first wavelength of light. In some options, the optical device comprises one or more optical elements included in at least one of the first light refracting path or the second light refracting path, each of the one or more optical elements having a corresponding an index of refraction that changes with wavelength of light at a different rate than an index of refraction of the grating medium. In some options, the first light refracting path includes a surface portion of the a first optical element of the one or more optical elements. In some options, the second light refracting path includes a surface portion of the a second optical element different from the first optical element. In some options, an index of refraction associated with an environmental medium included in at least one of the first light refracting path or the second light refracting path changes with wavelength of light at a different rate than an index of refraction of the grating medium. In some cases, the second wavelength of light is incrementally different from the first wavelength of light. These operations may be performed according to the dispersion compensation techniques described herein. In certain examples, aspects of these operations may be performed as described with reference to FIGS. 1 through 6.

In some cases, the determining a dispersion-compensated second hologram grating vector may comprises determining the dispersion-compensated second hologram grating vector based at least in part on a dispersion relationship corresponding to the probe hologram grating vector and the first hologram grating vector. These operations may be performed according to the dispersion compensation techniques described herein. In certain examples, aspects of these operations may be performed as described with reference to FIGS. 1 through 6.

In some cases, the determining a dispersion-compensated second hologram grating vector may comprises determining the dispersion-compensated second hologram grating vector based at least in part on a first vector difference between the probe hologram grating vector and the first hologram grating vector. These operations may be performed according to the dispersion compensation techniques described herein. In certain examples, aspects of these operations may be performed as described with reference to FIGS. 1 through 6.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein given the benefit of the present disclosure. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the dispersion compensated holographical optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein throughout the entirety of the specification, should be understood to control over dictionary definitions, definitions in documents incorporated by reference, and/or ordinary meanings of the defined terms. The terms and phases described below are not to be accorded any special meaning by comparison with the other terms and phases described above and throughout the specification. Rather, the terms and phases described below are provided for additional clarity and as further examples of the subject technology in accordance with aspects of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 221.03.

The term "approximately," refers to plus or minus 10% of the value given.

The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of holographic optical elements according to the present disclosure may have a reflective axis that differs from surface normal, or in some cases may have a reflective axis that is coincident with surface normal. Persons skilled in the art given the benefit of the present disclosure will recognize that a reflective axis angle can be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by holographic optical elements and helps avoid potentially confusing terminology. For example, where a hologram recording is said to be configured to "reflect" incident light, a conventional artisan might prefer to say the hologram recording is configured to "diffract" incident light, since hologram recordings are generally thought to act on light by diffraction. However, such use of the term "diffract" would result in expressions such as "incident light is diffracted about substantially constant reflective axes," which could be confusing. Accordingly, where incident light is said to be "reflected" by a hologram recording, persons of ordinary skill in art, given the benefit of this disclosure, will recognize that the hologram recording is in fact "reflecting" the light by a diffractive mechanism. Such use of "reflect" is not without precedent in optics, as conventional mirrors are generally said to "reflect" light despite the predominant role diffraction plays in such reflection. Artisans of ordinary skill thus recognize that most "reflection" includes characteristics of diffraction, and "reflection" by a holographic optical element or components thereof also includes diffraction.

The term "light" refers to electromagnetic radiation familiar to persons skilled in the art. Unless reference is made to a specific wavelength or range of wavelengths, such as "visible light", which refers to a part of the electromagnetic spectrum visible to the human eye, the electromagnetic radiation can have any wavelength.

The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the recording medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single complementary vector pair in k-space (or a substantially point-like complementary pair distribution in k-space).

The term "recording medium" refers to a physical medium that is configured with a hologram recording for reflecting light. A recording medium may include multiple hologram recordings.

The term "hologram recording" refers to one or more gratings configured to reflect light. In some examples, a hologram recording may include a set of gratings that share at least one common attribute or characteristic (e.g., a same wavelength of light to which each of the set of gratings is responsive). In some implementations, a hologram recording may include one or more holograms. In other implementations, a hologram recording may include one or more sinusoidal volume gratings. In some examples, the hologram recordings may be uniform with respect to a reflective axis for each of the one or more gratings (e.g., holograms or sinusoidal gratings). Alternatively or additionally, the hologram recordings may be uniform with respect to a length or volume for each of the one or more gratings (e.g., holograms or sinusoidal volume gratings) within the recording medium.

The term "polarization" refers to a property applying to transverse waves that specifies the geometrical orientation of the oscillations. Light in the form of a plane wave in space may be classified as linearly polarized. Implicit in the parameterization of polarized light is the orientation of the reference coordinate frame. A common coordinate system relates to a plane of incidence of the light associated with the incoming propagation direction of the light and the vector perpendicular to the plane of interface. A 'p' polarization state may refer to linearly polarized light whose electric field is along (e.g., parallel) to the plane of incidence. A 's' polarization state may refer to linearly polarized light whose electric field is normal to the plane of incidence. 'P' polarized light may also be referred to as transverse-magnetic (TM), pi-polarized, or tangential plane polarized light. 'S' polarized light may also be referred to as transverse-electric (TE), sigma-polarized, or sagittal plane polarized light.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

In the appended figures, similar components or features may have the same reference label. Further, various components of the same type may be distinguished by following the reference label by a dash and a second label that distinguishes among the similar components. If just the first reference label is used in the specification, the description may be applicable to any one of the similar components having the same first reference label irrespective of the second reference label.

What is claimed is:

1. A device configured to reflect light incident upon the device at an external angle of incidence, the device comprising:
a grating medium; and
a grating structure within the grating medium, the grating structure comprising at least two dispersion compensated holograms in the grating medium, wherein the light incident upon the device at the external angle of incidence is subject to dispersion that separates the light into first light of a first wavelength and second light of a second wavelength different from the first wavelength, the first wavelength being between 400-700 nm and the second wavelength being within 20 nm of the first wavelength, wherein the first light is incident upon the grating structure at a first internal angle of incidence, wherein the second light is incident upon the grating structure at a second internal angle of incidence different from the first internal angle of incidence, wherein the at least two dispersion compensated holograms are configured to reflect, about a reflective axis offset from a surface normal of the grating medium, the first light as first reflected light, wherein the at least two dispersion compensated holograms are configured to reflect, about the reflective axis, the second light as second reflected light, wherein the grating structure is configured to couple the first and second reflected light out of the grating medium, and wherein, after being coupled out of the grating medium by the grating structure, a color separation angle between the first and second reflected light is less than or equal to 0.050°.

2. The device of claim 1, wherein the color separation angle is less than or equal to 0.017°.

3. The device of claim 1, further comprising:
an optical element included in a light refracting path associated with the at least two dispersion compensated holograms, the optical element having an index of refraction that changes with wavelength of light at a different rate than an index of refraction of the grating medium.

4. The device of claim 1, wherein the first and second wavelengths are both wavelengths of a color band selected from the group consisting of: a red color band, a blue color band, and a green color band.

5. The device of claim 1, further comprising:
a first substrate and a second substrate structured to form a waveguide in which the grating medium is disposed.

6. The device of claim 1, further comprising:
a projection optic operatively coupled to a waveguide in which the grating medium is disposed.

7. The device of claim 1, wherein the grating medium is at least 70 µm thick and the at least two dispersion compensated holograms comprise a volume hologram.

8. The device of claim 7, wherein the at least two dispersion compensated hologram are structured to be Bragg-matched for at least some internal incidence angles for light of the first wavelength and light of the second wavelength within a total internal reflectance (TIR) range with respect to a first axis corresponding to a surface normal of a waveguide in which the grating medium is disposed.

9. The device of claim 7, wherein the at least two dispersion compensated hologram is structured to be Bragg-mismatched for at least some internal incidence angles for light of the first wavelength and light of the second wavelength within a total internal reflectance (TIR) range with respect to a first axis corresponding to a surface normal of a waveguide in which the grating medium is disposed.

10. The device of claim 1, further comprising:
an input coupling prism configured to receive the light incident upon the device at the external angle of incidence and configured to couple the first and second light into the grating medium.

11. The device of claim 10, wherein the input coupling prism has an index of refraction that changes with wavelength at a different rate than an index of refraction of the grating medium.

12. The device of claim 11, wherein the first and second light are configured to propagate along the grating medium via total internal reflection.

13. The device of claim 1, wherein a difference between the first and second wavelengths is less than or equal to 20 nm.

14. An optical device comprising:
a waveguide that includes a grating medium, wherein the grating medium has an index of refraction that changes with wavelength at a first rate;
an input coupling prism mounted to the waveguide, wherein the input coupling prism has an index of refraction that changes with wavelength at a second rate different than the first rate, wherein the input coupling prism is configured to receive light at an external angle of incidence, wherein the light received by the input coupling prism at the external angle of incidence is subject to dispersion at the input coupling prism that separates the light into first light of a first wavelength and second light of a second wavelength different from the first wavelength, and wherein the input coupling prism is configured to couple the first and second light into the waveguide; and dispersion compensating hologram structures in the grating medium, wherein the first light is incident upon the dispersion compensating hologram structures at a first internal incidence angle, wherein the second light is incident upon the dispersion compensating hologram structures at a second internal incidence angle different from the first internal incidence angle, wherein the dispersion compensating hologram structures are configured to reflect, about a reflective axis offset from a surface normal of the grating medium, the first light as first reflected light, wherein the dispersion compensating hologram structures are configured to reflect, about the reflective axis, the second light as second reflected light, and wherein the dispersion compensating hologram structures are configured to couple the first and second reflected light out of the waveguide.

15. The optical device of claim 14, wherein the first and second reflected light exhibit, after being coupled out of the waveguide, a color separation angle that is less than or equal to 0.050°.

16. The optical device of claim 15
wherein the color separation angle is less than or equal to 0.017°.

17. The optical device of claim 14, wherein first and second wavelengths are within a same color band.

18. The optical device defined in claim 14, wherein the input coupling prism has a first surface coupled to the waveguide and a second surface that receives the light at the external angle of incidence.

19. The optical device defined in claim 14 wherein the dispersion compensating hologram structures comprise volume holograms.

20. The optical device defined in claim 14, wherein the grating medium is at least 70 µm thick.

21. An optical system comprising:
a grating medium, wherein the grating medium has an index of refraction that changes with wavelength at a first rate;
an input coupling prism, wherein the input coupling prism has an index of refraction that changes with wavelength at a second rate different than the first rate, wherein the input coupling prism is configured to receive light at an external angle of incidence, wherein the light received by the input coupling prism at the external angle of incidence is subject to dispersion at the input coupling prism that separates the light into first light of a first wavelength and second light of a second wavelength different from the first wavelength, the first wavelength being between 400-700 nm and the second wavelength being within 20 nm of the first wavelength, wherein the input coupling prism is configured to couple the first and second light into the grating medium, and wherein the grating medium is configured to propagate the first and second light via total internal reflection; and dispersion compensating hologram structures in the grating medium, wherein the first light is incident upon the dispersion compensating hologram structures at a first internal incidence angle, wherein the second light is incident upon the dispersion compensating hologram structures at a second internal incidence angle different from the first internal incidence angle, wherein the dispersion compensating hologram structures are configured to reflect, about a reflective axis offset from a surface normal of the grating medium, the first light as first reflected light, wherein the dispersion compensating hologram structures are configured to reflect, about the reflective axis, the second light as second reflected light, wherein the dispersion compensating hologram structures are configured to couple the first and second reflected light out of the grating medium, and wherein, after being coupled out of the grating medium by the grating structure, a color separation angle between the first and second reflected light is less than or equal to 0.050°.

* * * * *